United States Patent [19]

Padilla, Sr.

[11] Patent Number: 4,674,446
[45] Date of Patent: Jun. 23, 1987

[54] GAS DEHYDRATOR WITH GAS RECOVERY SYSTEM

[76] Inventor: Isaac F. Padilla, Sr., 1046 RD 3000, Farmington, N. Mex. 87401

[21] Appl. No.: 853,743

[22] Filed: Apr. 18, 1986

[51] Int. Cl.$^4$ .......................... B01D 19/00; B01D 1/02
[52] U.S. Cl. ......................................... 122/33; 55/32; 55/174; 55/175
[58] Field of Search .......................... 55/32, 174, 175; 122/33

[56] References Cited

U.S. PATENT DOCUMENTS

| | | | |
|---|---|---|---|
| 3,206,916 | 9/1965 | Glasgow et al. | 55/32 |
| 3,318,071 | 5/1967 | Sinex | 55/174 |
| 3,348,601 | 10/1967 | Hill | 55/32 |
| 4,280,867 | 7/1981 | Hodgson | 55/32 |
| 4,342,572 | 8/1982 | Heath | 55/175 |

*Primary Examiner*—Albert W. Davis, Jr.
*Attorney, Agent, or Firm*—Harvey B. Jacobson

[57] ABSTRACT

A heating chamber is provided for receiving well effluent therein including oil, water and gas and a heated chamber is also provided for containing glycol to be heated. Heat exchange coils are disposed in the chambers and are serially connected in a loop flow path with gas pressure operated pump structure operatively associated with the flow path for pumping glycol therethrough. Gas-fired heating structure is operatively associated with the heated chamber for heating glycol therein and a gas outlet from the heating chamber comprises a source of well gas under pressure through supply structure supplying well gas to the pump and burner structures. The supply structure includes a glycol-gas contactor for drying the gas provided from the supply structure to the pump. Glycol is supplied from the heated chamber to the glycol-gas contactor and the wet glycol discharged from the contactor is returned to the heated chamber through a heat exchange structure disposed within a storage tank communicated with the heated chamber for receiving glycol therefrom as glycol is drawn from the storage tank, and therefore the gas used to effect the glycol circulation in the two circulation loops is captured, stored and used as burner fuel and to operate other controls.

9 Claims, 4 Drawing Figures

GAS DEHYDRATOR WITH GAS RECOVERY SYSTEM

BACKGROUND OF THE INVENTION

1. Field of the Invention

This invention relates to a well gas powered well effluent heat treating system and more specifically to a well effluent heat treating system of the gas powered type including features thereof which substantially increase gas recovery of the effluent and enable the recovered gas to be dried for substantially direct commercial usage without further treatment.

2. Description of the Related Art

Various forms of well effluent heat treating systems heretofore have been provided such as those disclosed in U.S. Pat. Nos. 1,765,427, 3,108,575, 4,149,673, 4,165,759 and 4,421,062. However, while U.S. Pat. No. 4,421,062 discloses a well effluent heat treating system including many of the structural and operational features of the instant invention, the instant invention includes additional structural and operational features which result in substantial increases in the recovery of gas and also in the drying of the gas for substantially direct commercial usage.

SUMMARY OF THE INVENTION

In a well gas powered well effluent heat treating system of the type disclosed in U.S. Pat. No. 4,421,062, a portion of the natural gas effluent from a well is utilized as a fuel for heating a glycol regenerator and as a source of power to power a gas jet pump for circulating heated glycol between a sparator tank and a reboiler. Also, the gas effluent is used as a source of power for operating a control system controlling the circulation of glycol and the operation of the burner provided to heat the reboiler. However, the gas component of the well effluent heat treating system is vented to the atmosphere and comprises a substantial waste of usable hydrocarbon fuel.

In the instant invention, the gas used to power the gas jet pump is captured in an enclosed system as described in U.S. Pat. No. 4,421,062. However, a portion of the gas component of the well effluent also is used to power a glycol pump for circulating dried glycol and passing the dried glycol in intimate contact with substantially the entire gas component of the well effluent once the system has been placed in operation. There are two complete separate glycol circulation systems in the instant invention. One system is powered by a gas powered jet pump and circulates heated glycol through a heat exchanger in the reboiler and then through a heat exchanger in the separator. This system is used on a natural gas dehydration unit to control the temperature of the well effluent in the separator. The second system is powered by a combination of water saturated glycol and natural gas and circulates cool glycol from a glycol storage tank through a gas-glycol contactor to effect drying of substantially the entire gas component of the well effluent once the system has been placed in operation. Both systems use gas pressure to create the necessary driving force. Normally, this gas is vented and wasted. In my prior U.S. Pat. No. 4,421,062, the gas from the jet pump circulating system can be recovered. The instant invention relates to a means for capturing and recovering gas used by a second circulating system and also using the recovered gas for burner fuel and other supply gas, therefore greatly increasing the efficiency of the dehydration unit and lowering its operating expense.

In one disclosed form of the invention, the high pressure glycol discharged from a contactor along with certain amounts of gas is utilized to power a 2-stage balanced pump for pumping dry glycol from a storage tank communicated with a reboiler through the contactor and thereafter back into the reboiler, through the necessary piping, pots and controls to recover the exhaust gas and enable its use as fuel and supply gas rather than venting the gas to the ambient atmosphere.

In addition, another disclosed form of the invention utilizes an alternate method of reclaiming well effluent gas and preventing its wasteful venting to the ambient atmosphere. A motor driven pump is used to effect dry glycol circulation from a storage tank communicated with a reboiler to a contactor. With this alternate method, the wet glycol and a certain amount of gas are automatically dumped by means of a liquid level controlled dump valve and thereafter are allowed to flow back into the reboiler and through the same as well as necessary piping, pots and controls to recover the exhaust gas for use as fuel and supply gas. This alternate method circulating the cool dry glycol through the gas-glycol contactor uses a motor driven pump to create greater pressure than the gas-glycol contactor operating pressure and thereby to effect the passing of dry glycol into intimate contact with the gas component of the well effluent in the gas-glycol contactor. As the glycol falls to the bottom of the contactor, it absorbs water in the gas flow. As the glycol liquid level rises in the bottom of the gas-glycol contactor a liquid level control operates a valve to control the liquid level. As this valve opens, the natural gas pressure in the vessel will force the wet glycol and some of the natural gas out of the vessel and through the system including various piping sections and pots for recovery of the gas.

The system of the instant invention treats the gas effluent from the associated well in a gas-glycol contactor immediately subsequent to the discharge of the gas component of the well effluent from a separator tank which initially receives the well effluent. The dry gas discharged from the contactor then may be used more efficiently as burner gas and burner pilot gas and also to operate a gas jet pump for pumping heat transfer liquids such as tri-ethylene glycol through a closed loop circuit including heating exchangers disposed within the separator tank and an associated regenerator or reboiler. The remaining dried gas component may be collected and commercially marketed. In addition, in one disclosed form of the invention the high pressure wet glycol discharged from the contactor is utilized to power a 2-stage balanced pump for pumping dry glycol from a storage tank communicated with the reboiler, through the contactor and thereafter back into the reboiler.

The main object of this invention is to provide an apparatus for recovering the gas used to power a 2-stage balanced glycol pump used to circulate glycol through a glycol-gas contactor for the purpose of drying substantially the entire gas component of well effluent being treated. In this manner, the gas component of the well effluent may be used more effectively for fuel, control of the system and commercial sale.

A further object of this invention is to provide structure by which gas utilized to power a jet pump may be recovered.

Another object of this invention is to provide two completely separate glycol circulation systems on a natural gas dehydrator with one system being provided to circulate heated glycol through a regenerator and thereafter through a separator through the utilization of a gas powered jet pump to control the temperature of the well effluent in the separator. The second system is operative to circulate dry cool glycol from a dry glycol storage tank, through a gas-glycol contactor vessel and then through necessary piping, controls, a heat exchanger, volume pots and a regenerator and then back to the dry glycol storage tank. Both of these systems use gas pressure for the driving force and the instant invention provides the means for recovery of the driving force gas and its beneficial use.

A further object of this invention is to provide a structure by which either one of two glycol circulation systems may be used independently of each other or simultaneously in conjunction with each other in a well effluent heat treating system.

Still another object of this invention is to provide a well effluent heat treating system which may be substantially continuously operated in a well effluent heat treating mode independent of moving mechanical components other than thermostatically controlled valves and manual and automatic operating valves.

Another object of this invention is to provide a well effluent heat treating system operative to utilize a gas pressure operated pump for effecting circulation of a heat exchange fluid and including structure whereby the gas exhausted from the pump is reclaimed and used as fuel for both the gas fired burner and the burner pilot, and as supply gas to operate other controls.

Still another object of this invention is to provide a well effluent heat treating system in accordance with the immediately preceding object and whereby the gas component of the effluent of a well may be treated by a gas glycol contactor to thereby afford a supply of dry gas as fuel for the gas fired burner and the burner pilot.

Another object of this invention, in accordance with the immediately preceding objects, is to provide a well effluent heat treating system including a gas-glycol contactor for drying the gas component of the well effluent and which will therefore enable excess gas effluent from the well, in addition to that utilized as fuel for the gas fired burner and the burner pilot, to be commercially marketed of as dry gas at a higher price.

A final object of this invention to be specifically enumerated herein is to provide a well effluent heat treating system in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
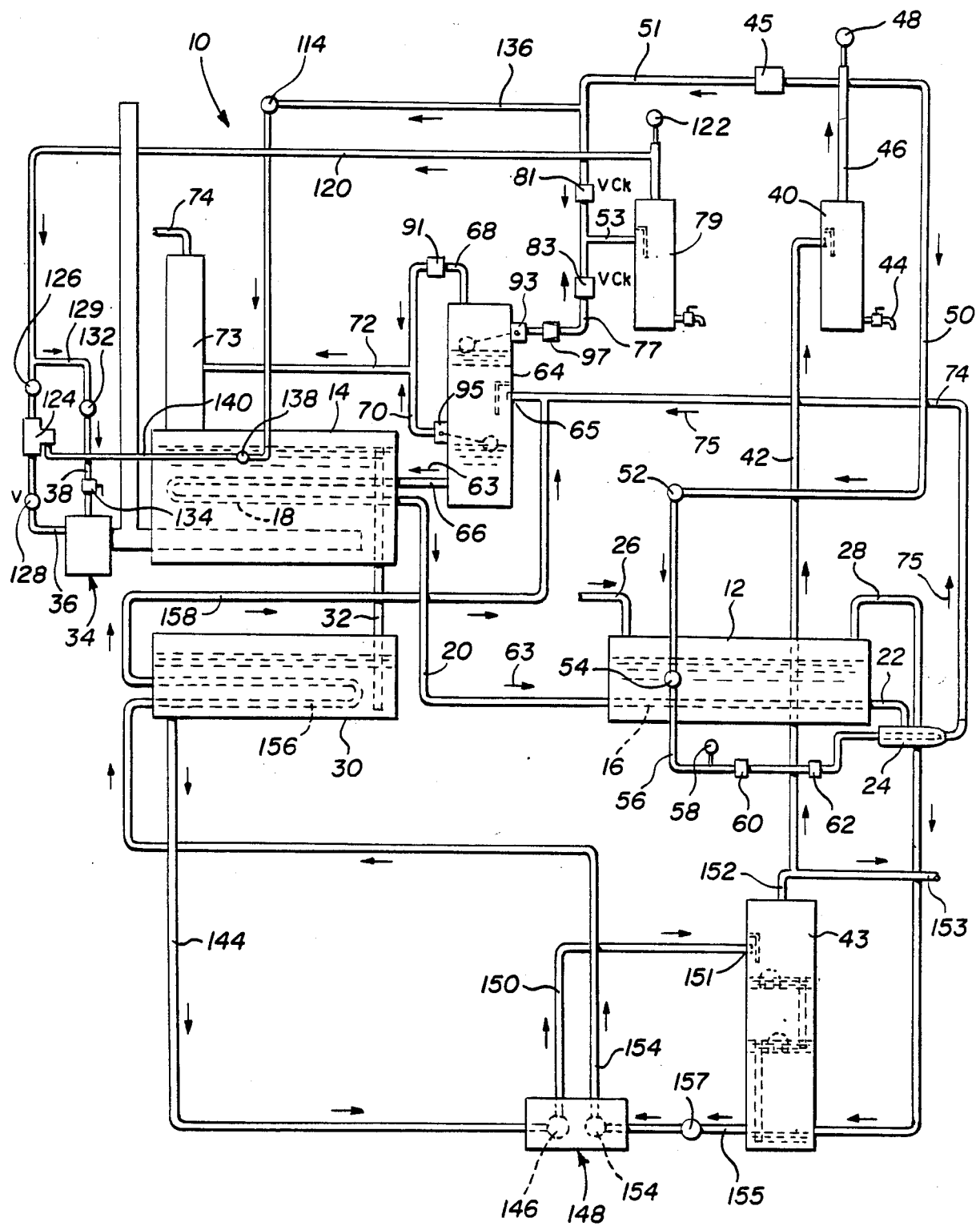
FIG. 1 is a schematic view of a first form of well effluent heat treating system and gas recovery system of the instant invention.

Referring now more specifically to the drawings, the numeral 10 generally designates the basic well effluent heat treating system of the instant invention. The system 10 includes a first well effluent heating or separator tank 12, a second heated or reboiler tank 14, a pair of heat exchange coils or pipes 16 and 18 in tanks 12 and 14 and connecting pipes 20 and 22 communicating the pipes 16 and 18. The pipes or coils 16 and 18 and the pipes 20 and 22 define a loop circuit in which there is disposed a gas jet pump 24 for pumping a heat transfer liquid such as tri-ethylene glycol through the loop. The tank 12 includes a well effluent inlet 26 and a gas outlet 28 as well as liquid outlet (not shown) under the control of a float-type dump valve. The tank 14 is communicated with a storage tank 30 disposed below the tank 14 by a pipe 32 and the tank 14 and the tank 30 has a heat transfer liquid of any suitable type such as tri-ethylene glycol disposed therein. The tank 14 further includes a gas fired burner referred to in general by the reference numeral 34 operatively associated therewith and the burner 34 includes burner and pilot gas supply lines 36 and 38.

An initial drip pot 40 is provided for receiving a supply of well gas under pressure through a supply line 42 opening into the drip pot 40 at its discharge end. The gas supply line 42 receives its supply gas from the outlet 28, but a gas-glycol contactor 43 communicates the outlet 28 with the line 42. The drip pot 40 includes a valved drain line 44 and an outlet line 46 having a pressure gauge 48 communicated therewith and opening into a line 50 having a pressure regulator 52 serially connected therein. The gas is supplied to the drip pot 40 through the line 42 at a pressure between 25 psi and 100 psi and the regulator 52 limits the pressure of gas in the line 50 downstream from the regulator 52 to approximately 25 psi. The line 50 extends to a thermostat controlled valve 54 which senses the temperature of the well effluent in the tank 12 and a line 56 extends from the thermostat 54 to the pump 24 and has a manual valve 60 and a check valve 62 serially connected therein, the check valve 62 being disposed downstream from the valve 60 also, a pressure gauge 58 is operatively communicated with the line 56.

The gas supplied to the pump 24 through the line 56 functions in the same manner as the gas supplied to the similar pump disclosed in U.S. Pat. No. 4,421,062 and causes glycol to flow through the lift pipe 74 back toward the tank 14 in the direction of the arrows 75, the lift pipe 74 opening into a volume pot 64 as at 65 and glycol flows from the lower portion of the volume pot 64 into the heat exchange coil 18 through pipe 66. The volume pot 64 includes high and low wet glycol outlets 68 and 70 opening into a line 72 communicated with a mid-height portion of a still 73 including an upper water vapor outlet 74 and opening downwardly into the tank 14. The pot 64 includes a further gas outlet 77 opening into a drip pot 79 and the line 51 is communicated with the interior of the drip pot 79 through a check valve 81, the gas outlet 77 including check valve 83.

The drip pot 79 includes an outlet line 120 having a pressure gauge 122 operatively associated therewith and the line 120 has a diaphragm-type motor valve 124 disposed therein. In adition, the line 120 includes a regulator 126 disposed therein intermediate the drip pot 79 and motor valve 124, the regulator 126 being set to 2-15 PSI. The line 120 includes a manual valve 128 downstream from the motor valve 124 and its outlet end comprises the burner gas supply line. In addition, the pilot gas supply line 129 extends from the line 120 to the burner pilot and has a regulator 132 and a manual valve 134 disposed therein.

The upper glycol outlet 68 includes a relief valve 91 disposed therein, the gas outlet 77 is closed by a float valve 93 responsive to a high liquid level in the volume pot 64 and the low glycol outlet 70 is closed by a float valve 95 responsive to the liquid level in the volume pot 64 being elevated above a low level.

The pipes or heat exchange coils 16 and 18, the pipes 20 and 22 and the lift pipe 74 as well as the volume pot 64 comprise a loop circuit. A second loop circuit begins with a discharge pipe 144 opening downwardly and outwardly from the tank 30 and extending to the dry glycol side 146 of a two-stage balanced pump referred to in general by the reference numeral 148. A discharge line 150 extends from the outlet of the dry glycol side 146 of the pump 148 and opens into the upper portion of the contactor 43 as at 151. A wet glycol discharge pipe 155 opens outwardly of the lower end of the contactor 43 and into the wet glycol side 154 of the pump 148, the upper portion of the contactor 43 including a dry gas outlet 152 with which the line 42 is communicated. In addition, a further discharge line 153 is comunicated with the dry gas outlet 152 and may be used to pipe dry gas to a point for commercial retail sales.

The pump 148 includes a wet glycol outlet 154 opening into a heat exchange coil 156 in the tank 30 and the coil 156 discharges from the tank 30 through a line 158 opening into the lift pipe 74 immediately prior to the latter opening into the volume pot 64.

The glycol within the tank 30 is cooled and the wet glycol passing through the heat exchange coil 156 is heated by the glycol within the tank 30.

The line 51 communicates with a line 136 having a regulator 114 disposed therein and extending to a thermostat control valve 138 which senses the temperature of the heat transfer liquid within tank 14, a line 140 extending from the valve 138 to the motor valve 124.

Assuming that the system 10 is at operating temperature, when heat is required for additional heating of the well effluent in the tank 12, the need for heat is sensed by the thermostat controlled valve 54 and gas flows through the line 50 into the line 56 and thereby through the pump 24 to cause heat transfer liquid to circulate through the heat exchange coils 16 and 18 and pipes 20 and 22. With the temperature of the heat transfer liquid within the tank 14 at a level above the desired temperature of the well effluent in the tank 12, the flow of heat transfer liquid through the heat exchange coils 16 and 18 and the pipes 20 and 22 provides the necessary additional heat within the tank 12 for heating the well effluent therein. However, when the heat of the heat transfer liquid within the tank 14 drops to a predetermined minimum, this is sensed by the thermostat controlled valve 138 which then allows gas to flow through the lines 136 and 140 to the diaphragm within the motor valve 124 opening the latter and allowing burner gas to flow through lines 120 and 36 for operation of the burner 34. Inasmuch as the line 129 communicates the line 120 with the pilot gas supply line 38, it may be seen that gas sufficient for operation for the pilot associated with the burner 34 is always available. Thus, the gas utilized to operate the pump 24 is finally discharged into the volume pot 64 and outward into pot 79 and the glycol passes outward to the still 73 and falls down into the tank 14.

The pump 148 discharges wet glycol and gas into volume pot 64 where the glycol falls by gravity to the lower end of the pot 64 and the gas rises to the top of the pot 64 and passes out through the high liquid flow control valve 93 through back pressure control valve 97, line 77, check valve 83, line 53 and into volume pot 79 for use as burner fuel or supply gas for operating other controls. The back pressure control valve 97 is set to control the pressure in volume pot 64 to a pressure not to exceed 10% of the operating pressure of the glycol gas contactor 43 to prevent stalling the balanced glycol pump 148. If the liquid rises in pot 64 and the high liquid control valve 93 closes preventing liquid or gas from passing out through line 77, the pressure will increase in pot 64 until it overcomes the relief valve 91 which will then open and allow the water saturated glycol to flow through line 72 and into the still column 73. The pressure relief valve 91 is set at a higher pressure than pressure control valve 97. The gas used by the pump 148 is therefore recovered and not vented to the ambient atmosphere.

Figure 2:
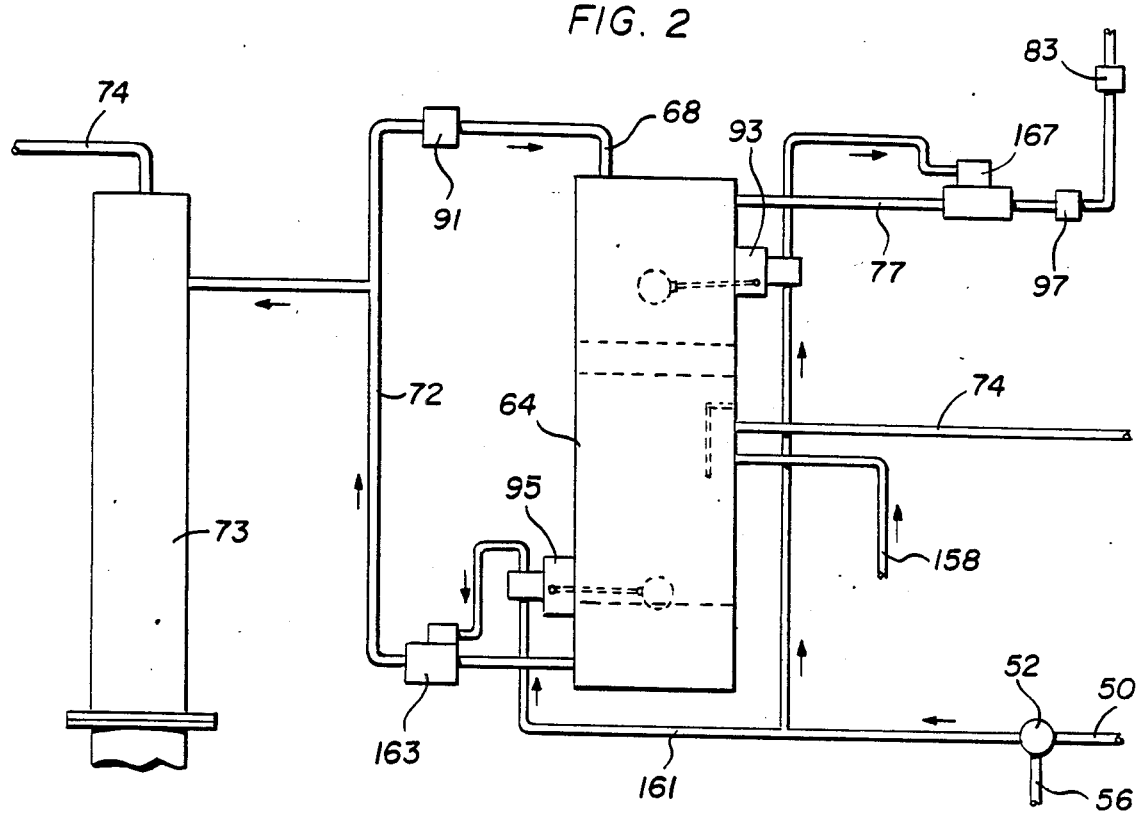
FIG. 2 is a fragmentary schematic view illustrating a first modification of a portion of the heat treating and gas recovery system illustrated in FIG. 1.

With attention now invited more specifically to FIG. 2 of the drawings, it may be seen that valve 95 may be used to control the flow of gas from line 50 through a line 161 to a motor control valve 163 which may open in response to the low liquid level in the volume pot 64 being increased to a predetermined level. On the other hand, if the liquid level within the volume pot 64 raises to a sufficiently high upper level, the control 93 will allow supply gas to flow to a motor valve 167 which will close to prevent liquid from flowing through the back pressure regulator 97 interposed in the gas outlet 77 and extending between the pot 64 and the check valve 83.

Figure 3:
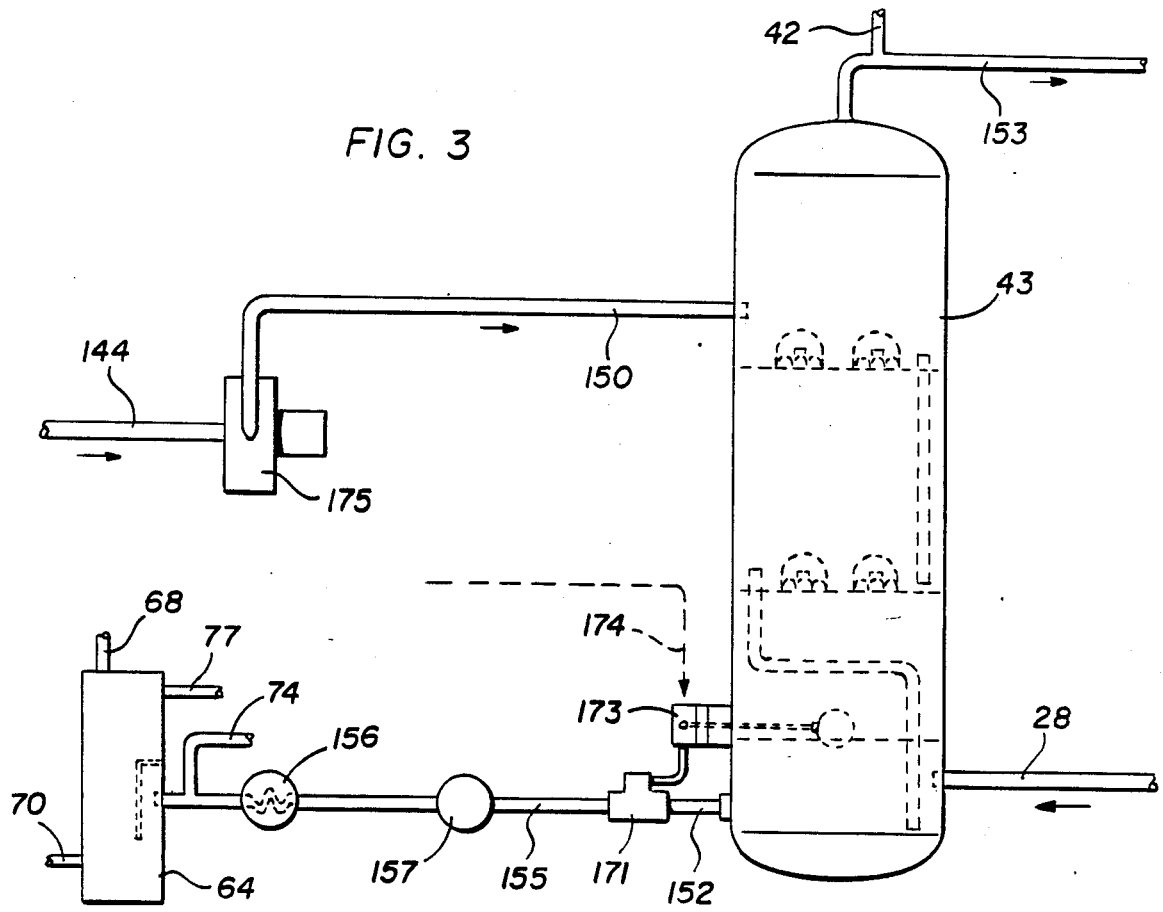
FIG. 3 is a fragmentary schematic view illustrating another modification of a further portion of the heat treating and gas recovery system illustrated in FIG. 1.

With attention now invited more specifically to FIG. 3, the balanced pump 148 has been eliminated and a motor control valve 171 is interposed in the line or pipe 155 extending from the wet glycol outlet of the contactor 43 to the heat exchanger 156 and thereafter to the volume pot 64. The contactor 43 is provided with a float control valve 173 for supplying gas to the valve 171 from line 174 and the line or pipe 155 includes a wet filter 157 therein. The line or pipe 144 extending from the tank 30 opens into the intake of a motor driven pump 175 and the outlet of the pump 175 is connected to the line or pipe 150 opening into the upper portion of the contactor 43, the line or pipe 150 comprising the dry glycol supply pipe for the contactor 43. The contactor 43 is operating under a pressure normally above 100 PSI and as the glycol flows from the contactor 43 to the accumulator or pot 64, there also is a certain amount of natural gas that flows with it and that gas is recovered in the pot 64.

In this form of the invention, the glycol and gas flowing through the line 155 may be combined with the glycol and gas circulated by the jet pump 24 to the pot 64 through line or pipe 74.

Figure 4:
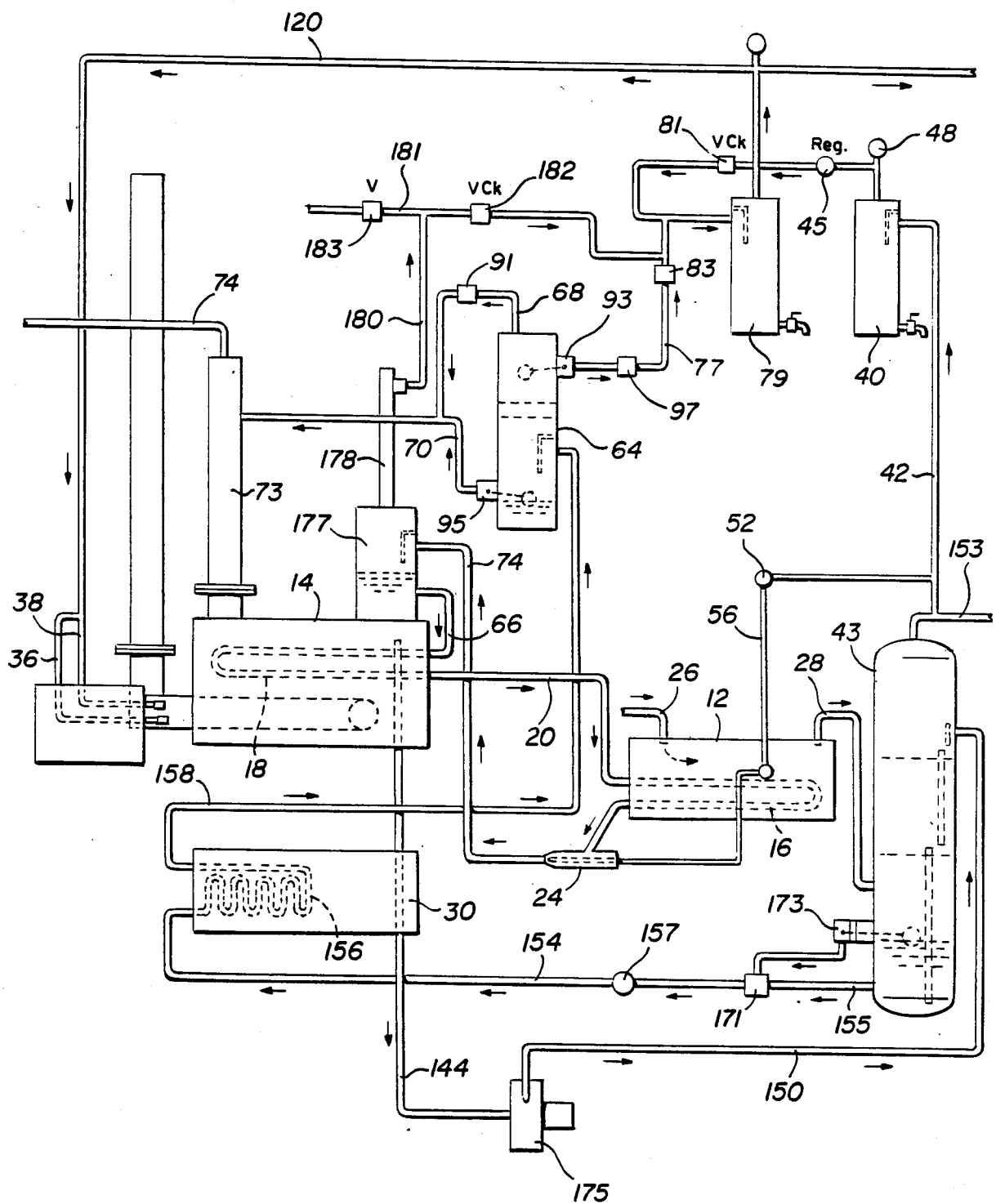
FIG. 4 is a schematic view illustrating another modification of the basic well effluent heat treating and gas recovery system of FIG. 1.

With attention now invited more specifically to FIG. 4, the tank or regenerator 14 incldues a pot 177 thereon into which the discharge from the pump 24 is piped through the pipe 74. The glycol discharged into the pot 177 passes therefrom through pipe 66 and into the heat exchanger 18 within the tank 14. The glycol flows from the heat exchanger 18 through the pipe 20 into the tank 12 and through the heat exchanger 16 therein back to the pump 24. The gas component discharged into the pot 177 from the pipe 74 passes upwardly through the housing 178 and into line 180 including a check valve 182 and discharging into line 77 upstream from the check valve 83 thereof. The gas discharge line 28 from the tank 12 opens into the contactor 43 and the glycol from the lower portion of the contactor 43 is discharged therefrom through line 155 under the control of the motor control valve 171 in the same manner as that shown in FIG. 4. The line or pipe 180 includes a branch line 181 having a pressure control valve 183 disposed therein to vent off some of the gas passing from the housing 178 to the drip pot 79 to prevent the system becoming balance locked.

With attention again invited more specifically to FIG. 4, the pot 64 into which the discharge from line 155 is piped through line 158 receives the wet glycol and gas from this circulation system. As the wet glycol and gas enter pot 64, the glycol falls to the bottom and through liquid level control 95, through line 70 and into the still column 73. The gas component discharged into pot 64 rises and is discharged through the high liquid shutoff control 93, through back pressure control 97, through check valve 83 and into accumulator pot 79 for use as fuel gas or control gas. If the liquid level rises and closes port 93, then relief valve 91 communicated with line 68 will open at a preset pressure and allow the wet glycol and gas to flow through line 70 and into still column 73. If the gas that is accumulated in pot 79 from the two circulation systems is not sufficient to operate the burner, then make-up regulator 45 will maintain an adequate supply pressure to pot 79.

FIG. 4 shows the two circulation systems as independent of each other and using two separate glycols. FIG. 1 shows the two circulation systems in combination with each other and also using one and the same glycol.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A well effluent heat treating system including a heating chamber for receiving well effluent therein including oil, water and gas, a heated chamber containing glycol to be heated, liquid heat exchange coils in said chamber serially connected in a liquid flow loop path, heating means for heating said glycol in said heated chamber, pump means for pumping liquid through said flow path, said heating chamber including a gas outlet, said heating means including gas burner means in good heat transfer relation with said glycol in said heated chamber, a source of well gas under pressure, said pump means comprising gas pressure operated pump means, supply means for supplying well gas from said source to said pump means and burner means, said supply means including a gas flow line extending from said source to said pump means and subsequently to said burner means and including a first thermostat controlled flow valve operable to open and close said first valve responsive to predetermined low and high temperatures in said heating chamber and a second thermostat controlled flow valve operable to open and close said second valve responsive to predetermined low and high temperatures in said heated chamber, said gas outlet comprising said source, said gas flow line, intermediate said source and said pump having a gas-glycol contactor serially connected therein, and glycol circulation means communicated with said heated chamber and contactor operative to effect a flow of glycol from said heated chamber, through said contactor for drying the gas passing therethrough and then back to said heated chamber.

2. The system of claim 1 including a glycol storage tank with which said heated chamber is communicated and to which glycol is supplied from said heated chamber responsive to glycol being withdrawn from said tank and returned to said heated chamber, said glycol circulation means being operative to flow glycol from said tank, through said contactor and back to said heated chamber.

3. A well effluent heat treating system including a heating chamber for receiving well effluent therein including oil, water and gas, a heated chamber containing glycol to be heated, glycol heat exchange coils in said chamber serially connected in a loop liquid flow path, heating means for heating the glycol in said heated chamber, pump means for pumping glycol through said loop flow path, said heating chamber including a gas outlet, said heating means including gas burner means in good heat transfer relation with said glycol in said heated chamber, a source of well gas under pressure, said pump means comprising gas pressure operated pump means, supply means for suppling well gas from said source to said pump means and burner means, said supply means including a gas flow line extending from said source to said pump means and subsequently to said burner means and including a first thermostat controlled flow valve operable to open and close said first valve responsive to predetermined low and high temperatures in said heating chamber and a second thermostat controlled flow valve operable to open and close said second valve responsive to predetermined low and high temperatures in said heated chamber, a heated glycol storage tank, means communicating an upper portion of said heated chamber with said storage tank for flowing heated glycol rising above a predetermined level in said heated chamber to said storage tank by gravity, a gas-glycol contactor including a dry glycol inlet, a wet glycol outlet, a wet gas inlet and a dry gas outlet, said storage tank including a heated glycol outlet communicated with said dry glycol inlet, a heat exchanger in said storage tank including an inlet and an outlet, means communicating said we glycol outlet with said heat exchanger inlet, means communicating said gas oulet with said contactor wet gas inlet, said contactor dry gas outlet comprising said source of well gas under pressure, and means communicating said heat exchanger means outlet with the interior of said heated chamber.

4. The system of claim 3 wherein said contactor dry gas outet includes outlet means for discharging a portion of the dry gas discharge from said contactor dry gas outlet to a commercial dry gas storage facility.

5. The system of claim 3 including a volume pot having a glycol inlet and high and low glycol outlets, said means communicating same heat exchanger means outlet with the interior of said heated chamber including first and second passage means communicating said heat exchanger means outlet with the inlet of said volume pot and said volume pot high outlet with the interior of said heated chamber, respectively, said flow path having said volume pot serially connected therein through said volume pot glycol and said low volume pot outlet.

6. The system of claim 5 including a two-stage balanced pump including a wet side having a wet glycol inlet and a wet glycol outlet and a dry side having a dry glycol inlet and a dry glycol outlet, said storage tank heated liquid outlet being communicated with said dry glycol inlet of said contactor through said dry side of said two-stage pump and the dry glycol inlet and dry glycol outlet thereof, said means communicating said wet glycol outlet of said contactor with said heat exchanger inlet including said wet side of said two-stage pump through the wet glycol inlet and wet glycol outlet thereof.

7. The system of claim 1 wherein said first and second thermostat controlled flow valves include means for operation under first and second pressures, respectively, and said first pressure is appreciably higher than said second pressure.

8. A well effluent heat treating system including a well effluent tank, a glycol tank, heat exchange means including a glycol loop flow path having heat exchange means in each of said tanks, gas pressure operated pump means for pumping glycol through said flow path, gas burner means for said glycol tank, well pressurized gas supply means, first gas delivery means operatively connecting said gas supply means to said pump through a thermostat valve operative to sense the need for heating said well effluent tank, a gas burner for heating said glycol tank, said gas delivery means for supplying gas being discharged from said pump to said burner and including a gas operated control valve, and third gas delivery means for delivering gas from said supply means to said control valve, said third gas delivery means including a thermostat operated valve responsive to a demand for heating said glycol tank, said well effluent tank including a gas outlet comprising said well pressurized gas supply means, said first gas delivery means including a gas-glycol contactor interposed therein for drying the gas flowing from said well effluent outlet, a glycol storage tank, means communicating said glycol tank with said storage tank for flowing glycol from said glycol tank to said storage tank responsive to glycol being withdrawn from said storage tank and returned to said glycol tank, and means establishing a second glycol loop flow path from said storage tank, through said contactor and back to said glycol tank, and pump means operative to pump glycol through said second glycol loop flow path from said storage tank through said contactor and back to said glycol tank.

9. The method of treating well effluent including oil, water and gas supplied to a closed effluent tank including a gas outlet, said method including providing a glycol tank and a glycol loop flow path including heat exchange portions disposed within said fluid tank and glycol tank, pumping glycol through said flow path responsive to a demand for heating said effluent tank and through the utilization of a gas pressure eductor pump serially connected in said flow path, separating the eductor pump gas discharge from the glycol within said flow path, drying said gas discharge in a glycol-gas contactor and communicating the dry gas discharge from said contactor with burner means for heating said glycol tank through a gas operated control valve to which gas is supplied from said gas discharge through a thermostat controlled valve operative to sense a need for heating said glycol tank.

* * * * *